(12) United States Patent
Ma et al.

(10) Patent No.: US 10,827,058 B2
(45) Date of Patent: Nov. 3, 2020

(54) CONTROL METHOD, CONTROL DEVICE, ELECTRONIC DEVICE AND STORAGE MEDIUM

(71) Applicant: GUANGDONG OPPO MOBILE TELECOMMUNICATIONS CORP., LTD., Guangdong (CN)

(72) Inventors: Jingyi Ma, Guangdong (CN); Shan Zhu, Guangdong (CN); Dingding Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/432,915

(22) Filed: Jun. 5, 2019

(65) Prior Publication Data
US 2019/0379781 A1    Dec. 12, 2019

(30) Foreign Application Priority Data

Jun. 11, 2018    (CN) .......................... 2018 1 0596344

(51) Int. Cl.
| | |
|---|---|
| *H04M 1/725* | (2006.01) |
| *G09G 3/3233* | (2016.01) |
| *G09G 3/34* | (2006.01) |

(52) U.S. Cl.
CPC ...... *H04M 1/72569* (2013.01); *G09G 3/3233* (2013.01); *G09G 3/3406* (2013.01); *H04M 1/72577* (2013.01); *G09G 2330/027* (2013.01)

(58) Field of Classification Search
CPC .......... H04M 1/72569; H04M 1/72577; G09G 3/3233; G09G 3/3406; G09G 2330/027; G02F 1/1336; H04W 48/02
(Continued)

(56) References Cited

U.S. PATENT DOCUMENTS

| | | | |
|---|---|---|---|
| 2006/0250142 A1* | 11/2006 | Abe | H03K 17/955 |
| | | | 324/663 |
| 2010/0026656 A1* | 2/2010 | Hotelling | G06F 3/044 |
| | | | 345/174 |

(Continued)

FOREIGN PATENT DOCUMENTS

| | | |
|---|---|---|
| CN | 102722297 | 10/2012 |
| CN | 103283210 | 9/2013 |

(Continued)

OTHER PUBLICATIONS

WIPO, English Translation of ISR for PCT/CN2019/090242, dated Aug. 27, 2019.

(Continued)

*Primary Examiner* — Mong-Thuy T Tran
(74) *Attorney, Agent, or Firm* — Hodgson Russ LLP

(57) ABSTRACT

The present disclosure provides a control method of an electronic device. The electronic device includes a touch display screen and a proximity sensor. The proximity sensor is disposed under a display area of the touch display screen. The control method includes: keeping the proximity sensor deactivated; determining whether the touch display screen is shielded according to a signal output by the touch display screen; controlling the touch display screen to enter a black-out state and activating the proximity sensor when the touch display screen is shielded; and controlling a display state of the touch display screen according to detection data of the proximity sensor. The present disclosure also provides a control device, an electronic device, a storage medium and a computer device.

19 Claims, 14 Drawing Sheets

(58) Field of Classification Search
USPC .................................................. 455/414.1
See application file for complete search history.

(56) References Cited

U.S. PATENT DOCUMENTS

| | | | |
|---|---|---|---|
| 2010/0149126 A1* | 6/2010 | Futter | G06F 1/3231 345/174 |
| 2012/0075222 A1* | 3/2012 | Kanda | G06F 1/3215 345/173 |
| 2012/0139877 A1* | 6/2012 | Kawabe | G06F 1/1643 345/175 |
| 2013/0288655 A1 | 10/2013 | Foruntanpour et al. | |
| 2013/0315419 A1 | 11/2013 | Chien | |
| 2014/0232540 A1 | 8/2014 | S | |
| 2015/0077140 A1* | 3/2015 | Chu | G06F 3/044 324/658 |
| 2016/0048370 A1* | 2/2016 | Zenoff | G09F 21/02 715/734 |
| 2016/0055778 A1* | 2/2016 | Kim | G09G 3/2003 345/618 |
| 2017/0223166 A1 | 8/2017 | Yoon et al. | |
| 2018/0203562 A1* | 7/2018 | An | H01Q 1/243 |
| 2019/0278412 A1* | 9/2019 | Byeon | G06F 3/04166 |
| 2019/0373490 A1* | 12/2019 | Rahmati | H04M 1/7253 |

FOREIGN PATENT DOCUMENTS

| | | |
|---|---|---|
| CN | 101632057 | 10/2013 |
| CN | 103369142 | 10/2013 |
| CN | 102301684 | 1/2014 |
| CN | 103870085 | 6/2014 |
| CN | 104246675 | 12/2014 |
| CN | 105630139 | 6/2016 |
| CN | 106131336 | 11/2016 |
| CN | 106506794 | 3/2017 |
| CN | 106793023 | 5/2017 |
| CN | 103558952 | 12/2017 |
| CN | 107707835 | 2/2018 |
| CN | 107767835 | 3/2018 |
| CN | 108848259 | 11/2018 |
| EP | 2784638 | 10/2014 |
| WO | 2008085418 | 7/2008 |

OTHER PUBLICATIONS

EPO, Office Action for EP Application No. 19178883.5, dated Nov. 14, 2019.

SIPO, First Office Action for CN Application No. 201810596344.1, May 8, 2020.

* cited by examiner

CONTROL METHOD, CONTROL DEVICE, ELECTRONIC DEVICE AND STORAGE MEDIUM

CROSS-REFERENCE TO RELATED APPLICATIONS

This application claims priority to Chinese Patent Application No. 201810596344.1, filed Jun. 11, 2018, the entire disclosure of which is incorporated herein by reference.

TECHNICAL FIELD

The present disclosure relates to the electronic technology field, and more particularly, to a control method, a control device, an electronic device, and a storage medium.

BACKGROUND

At present, full-screen mobile phone has become the featured product of the major mobile phone manufacturers. In the related art, in order to increase a screen-to-body ratio of the mobile phone, a proximity sensor is disposed below a display screen. However, since the proximity sensor emits infrared light continuously during working for detecting a distance between an object outside the mobile phone and the mobile phone, the infrared light easily causes electron transfer to occur in components in the display screen, resulting in local flicker phenomenon on the display screen, which is disadvantage for user experience.

SUMMARY

Embodiments of the present disclosure provide a control method, a control device, an electronic device, and a storage medium.

The present disclosure provides a control method of an electronic device. The electronic device includes a touch display screen and a proximity sensor. The touch display screen includes a display area. The proximity sensor is disposed under the display area of the touch display screen. The control method includes: keeping the proximity sensor deactivated; determining whether the touch display screen is shielded according to a signal output by the touch display screen; controlling the touch display screen to enter a black-out state and activating the proximity sensor, when the touch display screen is shielded; and controlling a display state of the touch display screen according to detection data of the proximity sensor.

The present disclosure further provides an electronic device. The electronic device includes a proximity sensor and a touch display screen. The touch display screen includes a display area. The proximity sensor is disposed under the display area of the touch display screen. The touch display screen is configured to detect a distance between an object and the electronic device when the touch display screen is in a light-up state, to output a signal for controlling a display state of the touch display screen. The proximity sensor is deactivated when the touch display screen is in the light-up state, and the proximity sensor is activated when the touch display screen is in the black-out state.

The present disclosure provides another electronic device. The electronic device includes a touch display screen, a proximity sensor, and a processor. The touch display screen includes a display area. The proximity sensor is disposed under the display area of the touch display screen. The processor is configured to: keep the proximity sensor deactivated; determine whether the touch display screen is shielded according to a signal output by the touch display screen; control the touch display screen to enter a black-out state and activate the proximity sensor, when the touch display screen is substantially shielded; and control a display state of the touch display screen according to detection data of the proximity sensor.

The present disclosure further provides a non-volatile computer readable storage medium including computer executable instructions that, when executed by one or more processors, cause the one or more processors to perform the control method of the electronic device.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
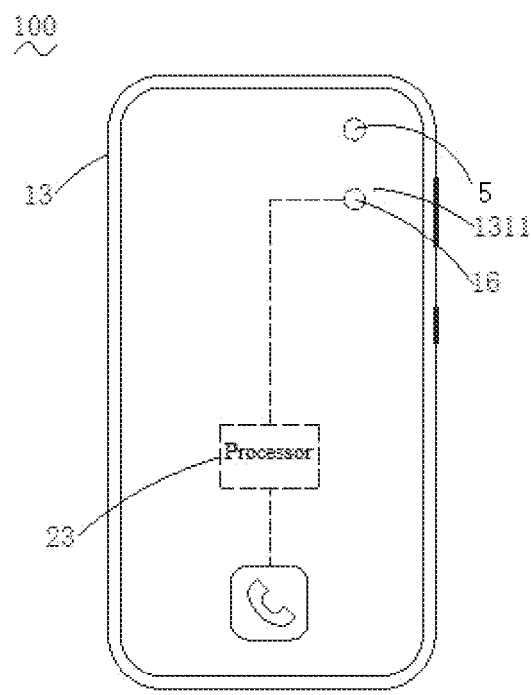
FIG. 1 is a plan schematic diagram of an electronic device according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

With the development of electronic devices, full screen has become the development trend of mobile phones. The feature of high screen-to-body ratio of the full screen limits an area left to the proximity sensor or other components at the top of the screen. When the proximity sensor is disposed under the light-transmissive display screen, the proximity sensor excites electrons in the display screen and causes flicker of the light-transmissive display screen in the process of emitting infrared light due to photoelectric effect, thereby interfering with normal display of the light-transmissive display screen and affecting the user experience.

Figure 2:
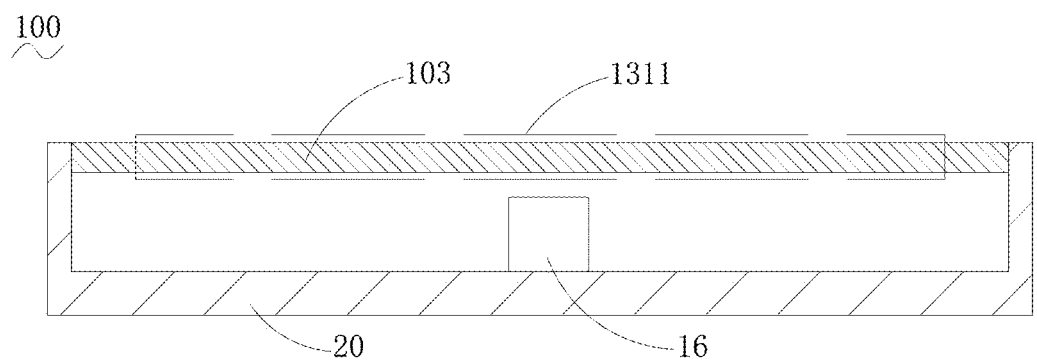
FIGS. 2-12 are schematic sectional views of an electronic device according to embodiments of the present disclosure.
Figure 3:
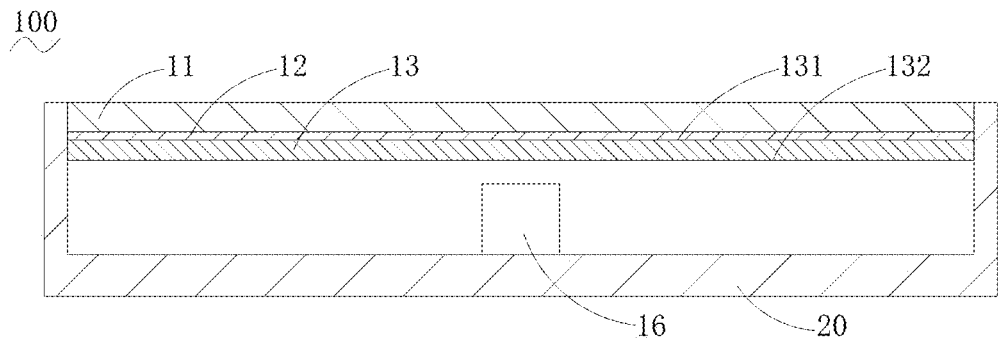

As illustrated in FIGS. 1-3, embodiments of the present disclosure provide an electronic device 100. The electronic device 100 includes a touch display screen 103, a proximity sensor 16, a light sensor 5, and a processor 23. The touch display screen 103 includes a display layer 13, the display layer 13 includes a display area 1311, and the proximity sensor 16 is disposed under the display area 1311. Infrared light emitted by the proximity sensor 16 can pass through the display area 1311. The proximity sensor 16 is configured to emit infrared light and receive the infrared light reflected by an object to detect a distance between the object and the electronic device 100.

Embodiments of the present disclosure are illustrated by taking the electronic device 100 being a mobile phone as an example. The proximity sensor 16 is provided in the mobile phone to determine the distance between the mobile phone and the obstacle and to make adjustment accordingly, thus preventing misoperations of a user and saving power consumption of the mobile phone. When the user answers or makes a call and brings the mobile phone close to his/her head, the proximity sensor 16 generates detection information by calculating the time when an emitter emits infrared light and the time when the receiver receives the reflected infrared light, and the processor 23 closes the display layer 13 according to the detection information. When the mobile phone is away from the head, the processor 23 again reopens the display layer 13 according to the detection information fed back by the proximity sensor 16.

In some embodiments, the display layer 13 includes an OLED display layer.

In detail, the OLED display layer has a good light transmittance and can transmit visible light and infrared light better. Therefore, the OLED display layer cannot affect the emission and reception of the infrared light by the proximity sensor 16 while presenting content. The display layer 13 can also be a Micro LED display layer, and the Micro LED display layer also has a good transmittance for visible light and infrared light. Certainly, these display layers are merely exemplary and embodiments of the present disclosure are not limited thereto. In addition, the display layer 13 may be disposed on the housing 20.

As illustrated in FIG. 3, in some embodiments, the touch display screen 103 further includes a transparent cover board 11 and a touch layer 12. The transparent cover board 11 is disposed on the touch layer 12, the touch layer 12 is disposed on the display layer 13, an upper surface 131 of the display layer 13 faces the touch layer 12, and the light transmittances of the transparent cover board 11 and the touch layer 12 for visible light and infrared light are both greater than 90%.

In detail, the touch layer 12 is mainly configured to receive a signal input by the user and transmit the signal to a circuit board for data processing, thereby obtaining a specific location where the user touches the touch layer 12. It should be noted that the touch layer 12 being disposed on the display layer 13 may refer to that the touch layer 12 is in contact with the display layer 13, for example, the touch layer 12 may be attached to the display layer 13 by using In-Cell or On-Cell bonding technology, which can effectively reduce the weight of the display layer 13 and the overall thickness of the display layer 13. The touch layer 12 being disposed on the display layer 13 may also refer to that the touch layer 12 is disposed above the display layer 13 and spaced from the display layer 13.

In addition, by disposing the transparent cover board 11 on the touch layer 12, the touch layer 12 and its internal structure can be effectively protected, and damage to the touch layer 12 and the display layer 13 by external forces can be avoided. The light transmittances of the transparent cover board 11 and the touch layer 12 for visible light and infrared light are both greater than 90%, which is not only advantage for the display layer 13 to present the content better, but also advantage for the proximity sensor 16 disposed under the display layer 13 to stably emit and receive the infrared light, thus ensuring normal operation of the proximity sensor 16.

Figure 4:
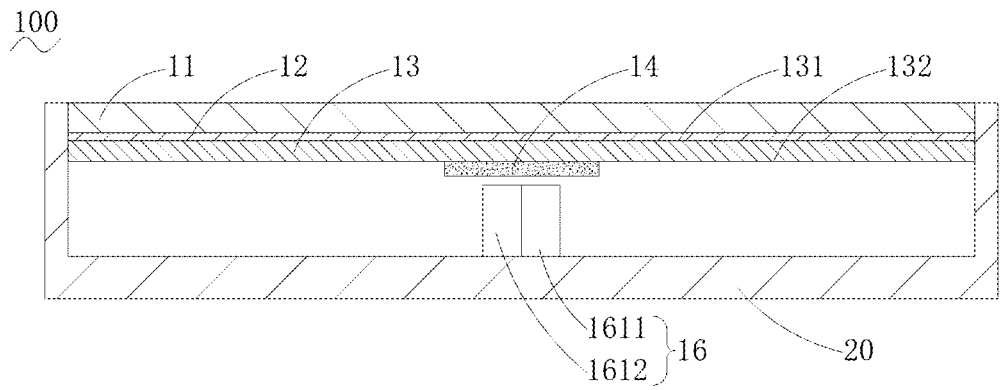

As illustrated in FIG. 4, in some embodiments, the display layer 13 includes the upper surface 131 and a lower surface 132. The electronic device 100 further includes a first coating layer 14 coated on the lower surface 132 and covering the proximity sensor 16. The first coating layer 14 is configured to transmit infrared light and block visible light, and the proximity sensor 16 is configured to transmit and/or receive infrared light through the first coating layer 14 and the display layer 13.

In detail, configuring the first coating layer 14 to transmit infrared light can ensure the normal operation of the proximity sensor 16, and configuring the first coating layer 14 to block the visible light can achieve the effect that the proximity sensor 16 is invisible when the electronic device 100 is viewed from the outside.

Figure 5:
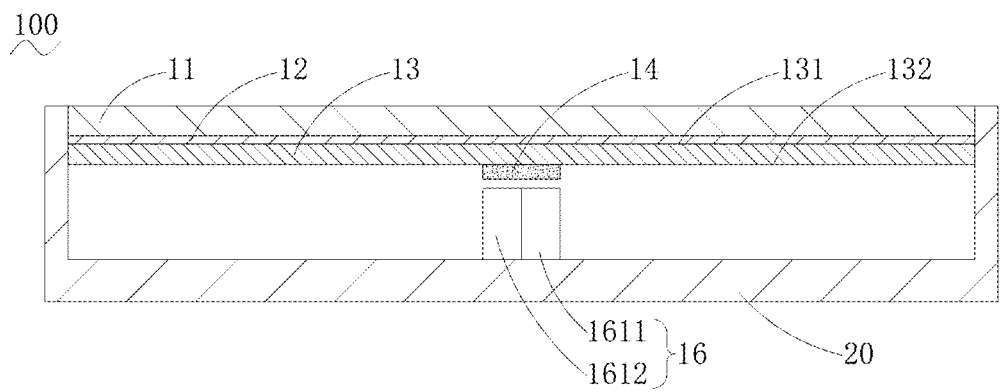

As illustrated in FIGS. 4 and 5, in some embodiments, the proximity sensor 16 includes an emitter 1611 and a receiver 1612. The emitter 1611 is configured to emit infrared light through the first coating layer 14 and the display layer 13, and the receiver 1612 is configured to receive infrared light reflected by the object to detect the distance between the object and the electronic device 100.

In detail, generally, when the user answers or makes a call, the electronic device 100 approaches the user's head, the emitter 1611 emits infrared light, the receiver 1612 receives the reflected infrared light, and the processor 23 calculates the time period from the emission to the reception of the infrared light, so as to issue a command accordingly to control the screen to turn off the backlight. When the electronic device 100 is away from the head, the processor 23 again calculates according to the feedback data and issues an instruction to turn on the backlight of the screen. In this way, the user's mis-operation is prevented, and the power consumption of the mobile phone is saved.

In some embodiments, the orthographic projection of the proximity sensor 16 on the lower surface 132 is within the orthographic projection of the first coating layer 14 on the lower surface 132.

In detail, the installation of the proximity sensor 16 during the assembly process generally requires the assembly gap to be reserved, resulting in a gap between the proximity sensor 16 and other components, which allows visible light to enter from the gap and causes light leakage. Therefore, in the direction in which the proximity sensor 16 and the display layer 13 are stacked, the area of the orthographic projection of the first coating layer 14 on the lower surface 132 is larger than the area of the orthographic projection of the proximity sensor 16 on the lower surface 132, such that the first coating layer 14 can sufficiently shield the proximity sensor 16 without affecting the normal operation of the proximity sensor 16, thus achieving the effect that the proximity sensor 16 is invisible when the electronic device 100 is viewed from the outside.

As illustrated in FIG. 5, in some embodiments, the orthographic projection of the proximity sensor 16 on the lower surface 132 coincides with the orthographic projection of the first coating layer 14 on the lower surface 132.

In detail, in the direction in which the proximity sensor 16 and the display layer 13 are stacked, the area of the orthographic projection of the first coating layer 14 on the lower surface 132 may be set to be equal to the area of the orthographic projection of the proximity sensor 16 on the lower surface 132. In this way, the first coating layer 14 can just shield the proximity sensor 16 without affecting the normal operation of the proximity sensor 16, such that the proximity sensor 16 is invisible when the electronic device 100 is viewed from the direction toward and perpendicular to the upper surface 131 of the display layer 13.

Figure 6:
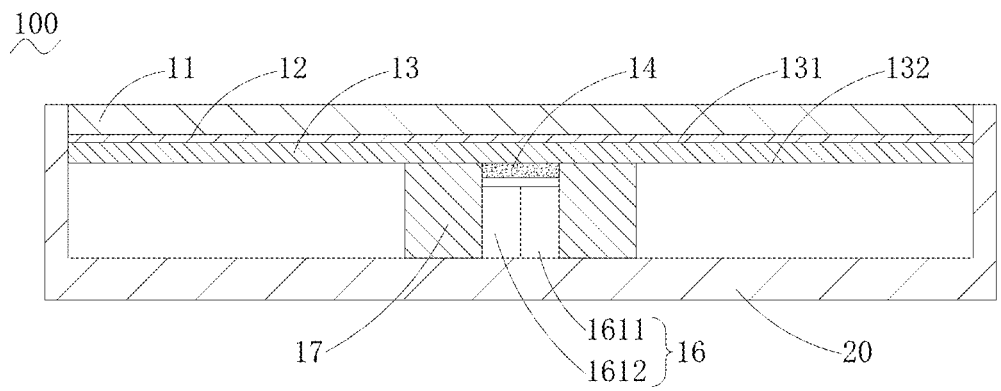

As illustrated in FIG. 6, furthermore, in this implementation, the electronic device 100 further includes a light shielding layer 17 disposed on the lower surface 132 and surrounding the proximity sensor 16.

In detail, when the area of the orthographic projection of the first coating layer 14 on the lower surface 132 is equal to the area of the orthographic projection of the proximity sensor 16 on the lower surface 132, since the volume of the space in which the proximity sensor 16 is placed is larger than the volume of the proximity sensor 16, the light leakage occurs in the space around the proximity sensor 16 when the electronic device 100 is viewed from the external environment. Therefore, by providing the light shielding layer 17 surrounding the proximity sensor 16, the gap between the proximity sensor 16 and the space around the proximity sensor 16 is filled, thereby eliminating the light leakage phenomenon. The light shielding layer 17 may be a foam made of black material, or may be other black foamed plastic or rubber. Certainly, these materials are merely exemplary and embodiments of the present disclosure are not limited thereto.

In some embodiments, the first coating layer includes IR ink. The IR ink has the transmittance for the infrared light that is greater than 85%, the IR ink has the transmittance for the visible light that is less than 6%, and the infrared light that can be transmitted by the IR ink has a wavelength from 850 nm to 940 nm.

In detail, since the IR ink has a low light transmittance for the visible light, the proximity sensor 16 disposed under the first coating layer 14 is not visually observed based on human vision when the electronic device 100 is viewed from the outside. Meanwhile, the IR ink has the high transmittance for the infrared light, such that the proximity sensor 16 can stably emit and receive infrared light, thus ensuring the normal operation of the proximity sensor 16.

Figure 7:
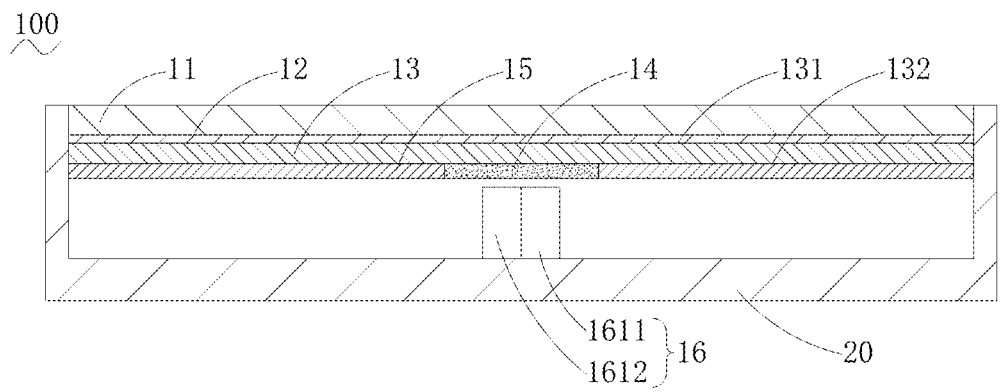
Figure 8:
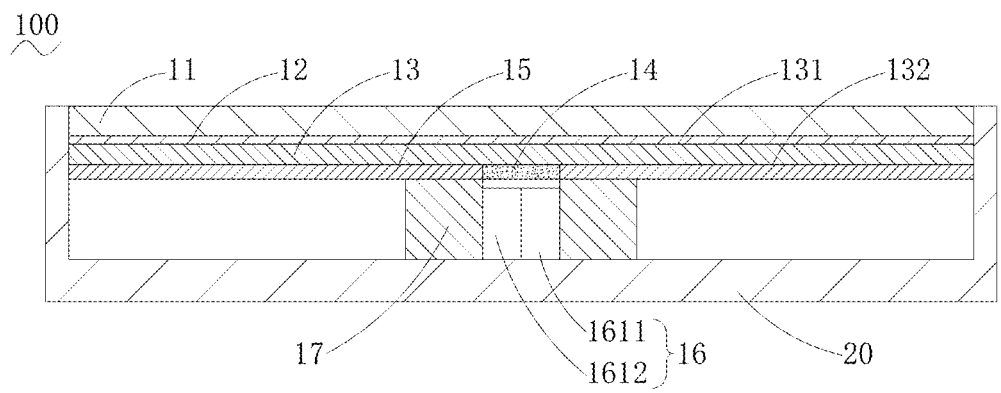

As illustrated in FIGS. 7 and 8, in some embodiments, the electronic device 100 further includes a second coating layer 15 coated on the lower surface 132 and in contact with the first coating layer 14.

In detail, the first coating layer 14 is mainly configured to transmit infrared light and shield the proximity sensor 16. However, since the cost of the IR ink applied to the first coating layer 14 is higher than that of the ordinary black ink, coating the lower surface 132 entirely with the IR ink will be disadvantage for reducing the production cost. Moreover, the ordinary black ink can achieve lower transmittance for the visible light than the IR ink, and the shielding effect is more prominent. Thus, providing the second coating layer 15 is not only advantageous to reduce the production cost, but also makes the shielding effect more in conformity to process requirements.

Figure 9:
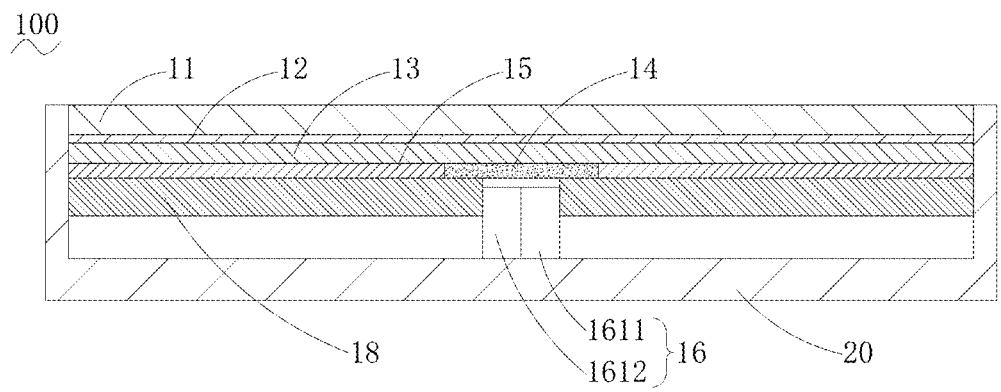
Figure 10:
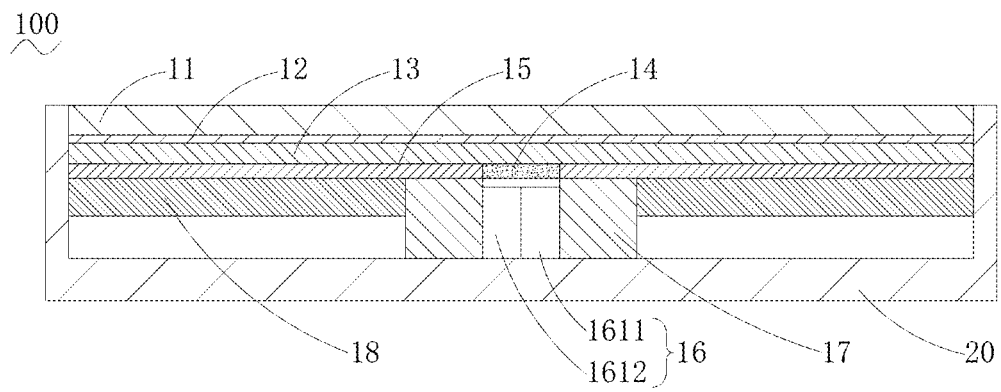

As illustrated in FIGS. 9 and 10, in some embodiments, the electronic device 100 further includes a cushioning layer 18 that covers the lower surface 132 and avoids the proximity sensor 16.

In detail, the cushioning layer 18 is configured to mitigate impact force and prevent vibration, so as to protect the touch layer 12, the display layer 13 and its internal structure, and to prevent the display layer 13 from being damaged by external impact. The cushioning layer 18 can be made of foam, foamed plastics, rubber or other soft material. Certainly, these cushioning materials are merely exemplary and embodiments of the present disclosure are not limited thereto. Furthermore, the proximity sensor 16 is avoided during providing the cushioning layer 18, in order to prevent the cushioning layer 18 from shielding the proximity sensor 16, thus preventing affecting the transmission and reception of the infrared light by the proximity sensor 16.

Figure 11:
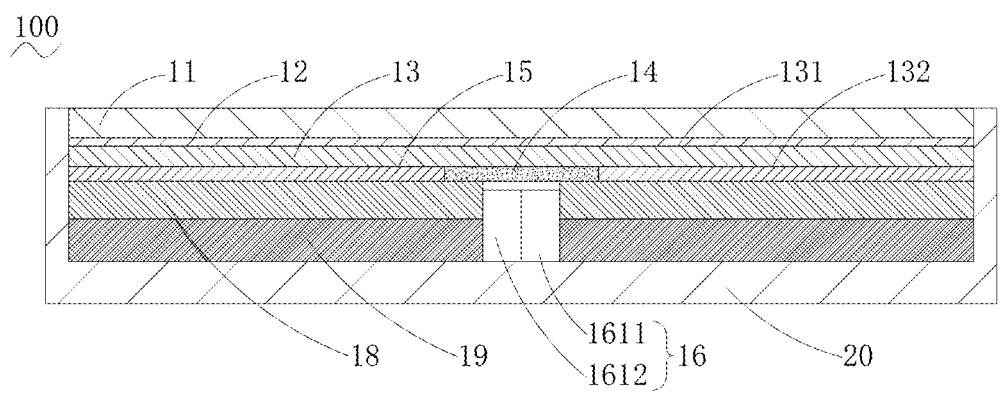
Figure 12:
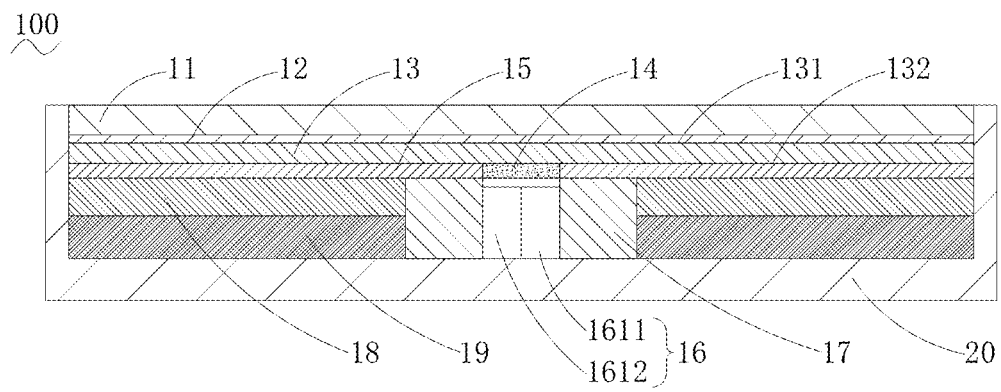

As illustrated in FIGS. 11 and 12, furthermore, in this implementation, the electronic device 100 further includes a metal sheet 19 covering the cushioning layer 18 and avoiding the proximity sensor 16.

In detail, the metal sheet 19 is configured to shield electromagnetic interference and for grounding, and has a function of diffusing temperature rise. The metal sheet 19 can be cut from metal materials such as copper foil or aluminum foil. Certainly, these metal materials are merely exemplary and the embodiments of the present disclosure are not limited thereto. Furthermore, the proximity sensor 16 is avoided during providing the metal sheet 19, in order to prevent the metal sheet 19 from shielding the proximity sensor 16, thereby preventing the proximity sensor 16 from being affected during the transmission and reception of the infrared light.

Figure 13:
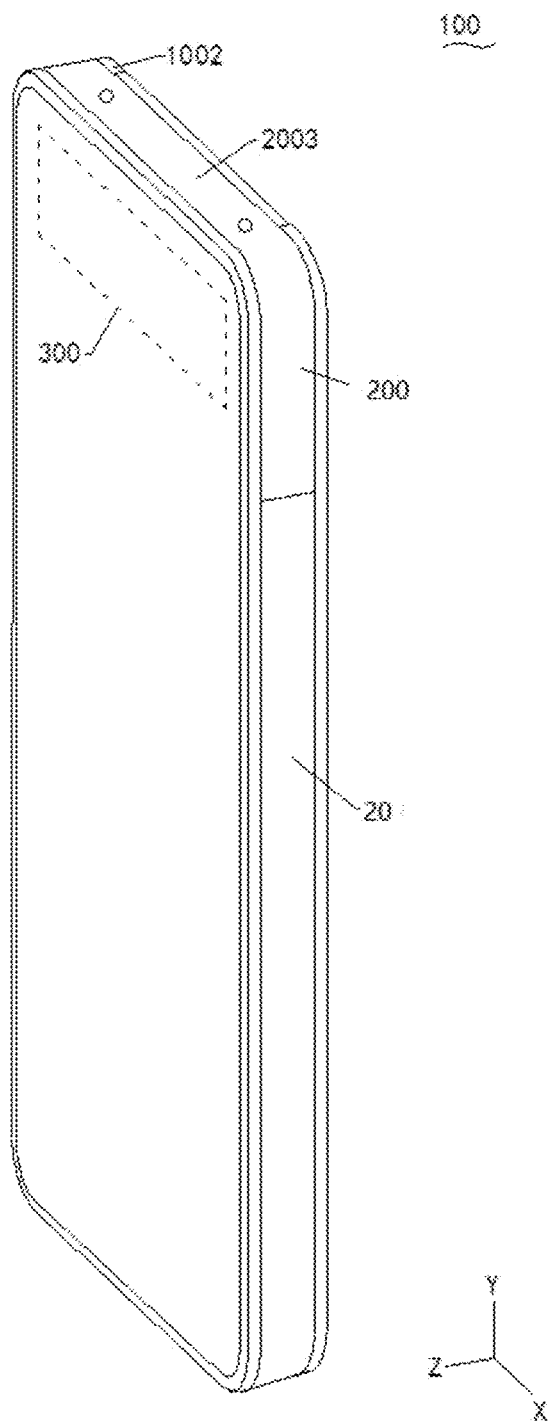
FIG. 13 is a schematic diagram of a state of an electronic device according to embodiments of the present disclosure.
Figure 14:
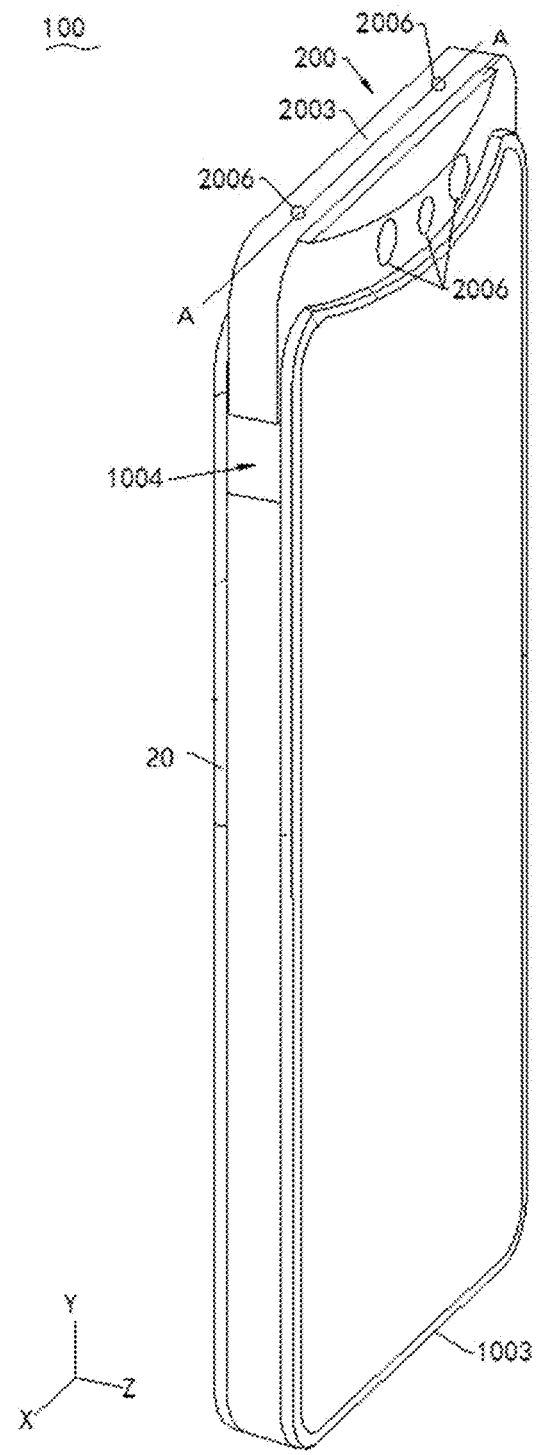
FIG. 14 is a schematic diagram of another state of an electronic device according to embodiments of the present disclosure.
Figure 15:
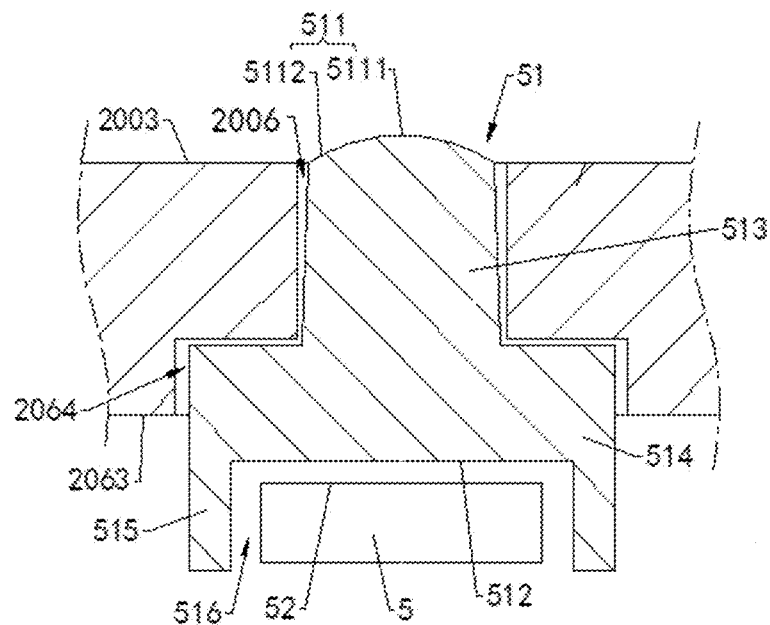
FIG. 15 is a partial sectional view of the electronic device along line A-A in FIG. 14.

As illustrated in FIGS. 13-15, in some embodiments, the electronic device 100 further includes a housing 20, a receiving case 200, a light guide 51, and a light sensor 5. The receiving case 200 is slidably coupled to the housing 20 and capable of extending out of or retracting into the housing 20. The receiving case 200 is provided with a light incident hole 2006. The light guide 51 is received in the receiving case 200 and partially extends into the light incident hole 2006. The light guide 51 has a light incident surface 511 and a light emitting surface 512 opposed to the light incident surface 511, the light incident surface 511 faces the outside of the receiving case 200, and the light emitting surface 512 faces the interior of the receiving case 200. The light sensor 5 is received in the receiving case 200 and directly faces the light emitting surface 512.

In this way, since the light incident hole 2006 is disposed in the receiving case 200 of the electronic device 100 instead of the touch display screen 103 of the electronic device 100, it can satisfy the requirement of the light sensor 5 to receive ambient light, without limiting the screen-to-body ratio of the touch display screen 103, so that the screen-to-body ratio of the electronic device 100 is relatively large.

In detail, as illustrated in FIGS. 13-14, the electronic device 100 is defined with reference to the viewing angle. The electronic device 100 has a width direction X, a length direction Y, and a thickness direction Z. The length direction Y is perpendicular to the width direction X, and the thickness direction Z is perpendicular to the width direction X and the length direction Y respectively.

The housing 20 further includes a top end face 1002 and a bottom end face 1003 disposed opposite to the top end face

1002. Generally, the top end face 1002 and the bottom end face 1003 may extend in the width direction X. In other words, the top end face 1002 and the bottom end face 1003 are short sides of the electronic device 100. The bottom end face 1003 is configured to arrange a connector, a microphone, a speaker and the like of the electronic device 100.

As illustrated in FIG. 14, a receiving groove 1004 is provided at the top of the housing 20. The receiving groove 1004 is recessed from the top of the housing 20 toward the interior of the housing 20. The receiving groove 1004 penetrates the side surface of the housing 20. The receiving case 200 is slidably coupled to the housing 20 in the receiving groove 1004. In other words, the receiving case 200 is slidably coupled to the housing 20 to extend out of or retract into the receiving groove 1004.

A functional element 300 may be disposed in the receiving case 200. The functional element 300 is, for example, a camera, an earpiece, or a laser emitter. The camera is exposed through the light incident hole 2006. For example, the functional element 300 is exposed through the light incident hole 2006 on the side surface of the receiving case 200. When the receiving case 200 extends out of the housing 20, the camera can capture an external image of the electronic device 100. The camera may be for example, an RGB camera.

In some embodiments, the receiving case 200 has an outer side surface, and a portion or all of the light incident surface 511 protrudes from the outer side surface. In this way, the receiving case 200 shield the light incident surface 511 less, or even does not shield the light incident surface 511, so that the light incident surface 511 can receive more ambient light, and the light guide 5151 can better guide external light into the light sensor 5.

In this embodiment, the outer side surface of the receiving case 200 includes a top surface 2003, and the top surface 2003 is provided with the light incident hole 2006. The light guide 51 is corresponding to the light incident hole 2006 located on the top surface 2003. In other words, the light sensor 5 receives light passing through the light incident hole 2006 located on the top surface 2003 via the light guide 51. Thus, the light sensor 5 can sense ambient light regardless of whether the receiving case 200 extends out of or retracts into the housing 20. Part or all of the light incident surface 511 protrudes from the top surface 2003.

Figure 16:
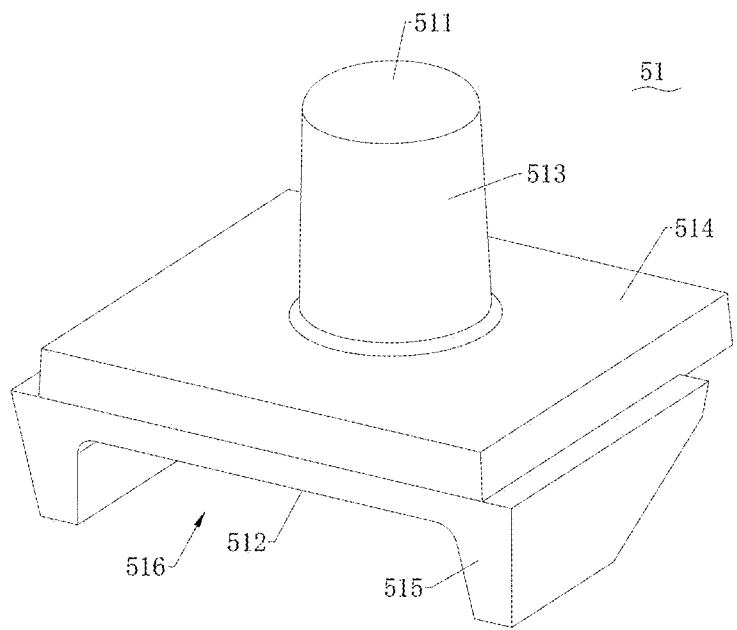
FIG. 16 is a schematic perspective view of a light guide in an electronic device according to embodiments of the present disclosure.
Figure 17:
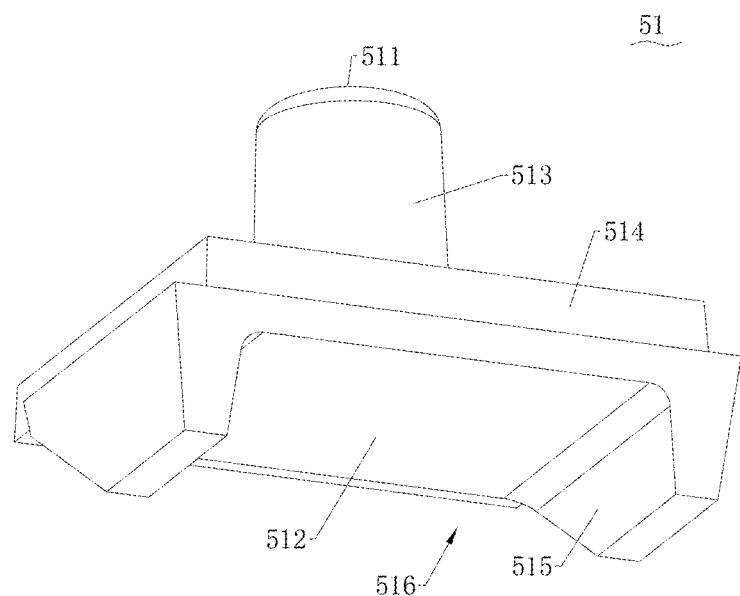
FIG. 17 is another schematic perspective view of a light guide in an electronic device according to embodiments of the present disclosure.

As illustrated in FIGS. 15-17, the light incident surface 511 has a central area 5111 and an edge area 5112 disposed around the central area 5111. The central area 5111 protrudes with respect to the edge area 5112. In this case, the area of the light incident surface 511 is large, and more external light can enter the light guide 51. The light incident surface 511 is a curved surface.

In some embodiments, the receiving case 200 has an inner side surface 2063. The inner side surface 2063 defines a positioning groove 2064. The positioning groove 2064 communicates with the light incident hole 2006. The light guide 51 includes a light incident portion 513 and a light emitting portion 514. The light incident surface 511 is an end surface of the light incident portion 513 away from the light emitting portion 514. The light emitting surface 512 is an end surface of the light emitting portion 514 away from the light incident portion 513. The light incident portion 513 passes through the light incident hole 2006, and the light emitting portion 514 is partially or completely inserted in the positioning groove 2064.

In this case, the light guide 51 and the receiving case 200 are fixed to each other and are not easy to slide. Meanwhile, a sealing element can be adhered to the surface of the light emitting portion 514 that faces the light incident portion 513. The sealing element is provided to surround the light incident portion 513 continuously. The sealing element is abutted against a groove wall surface of the positioning groove 2064 and the light emitting portion 514 to achieve sealing, preventing the external dust, water vapor or the like from entering the interior of the receiving case 200 through the light incident hole 2006.

In some embodiments, the area of the light emitting surface 512 is larger than the area of the light incident surface 511, and the cross-sectional area of the light incident portion 513 gradually increases in the direction of the light incident surface 511 toward the light emitting surface 512.

In detail, the light incident portion 513 is in a substantially truncated cone shape, which is advantage for light to transmit and diffuse in the light incident portion 513 to uniformly enter the light emitting portion 514.

In some embodiments, the light guide 51 further includes a positioning portion 515. The positioning portion 515 and the light emitting portion 514 enclose an accommodating space 516 for accommodating the light sensor 5. The light sensor 5 accommodated in the accommodating space 516 can be protected by the positioning portion 515 and the light emitting portion 514 from damage caused when the electronic device 100 is dropped or impacted. A gap is generated between the light emitting surface 512 and a photosensitive region 52 of the light sensor 5.

Figure 18:
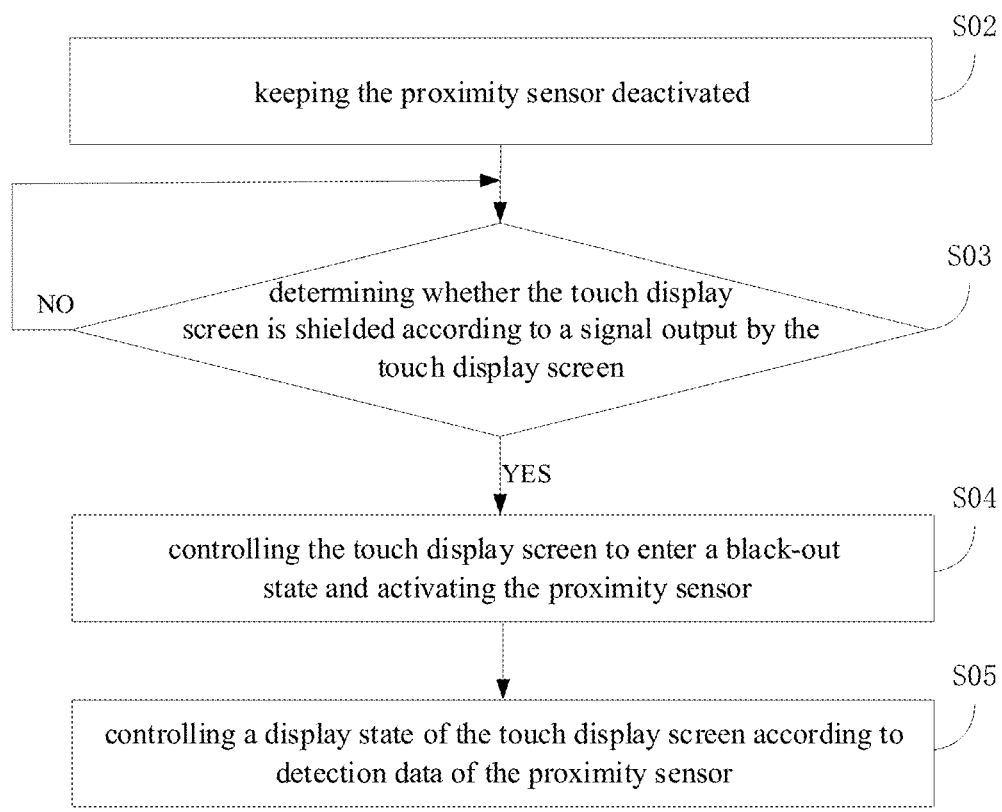
FIG. 18 is a schematic flow chart of a control method according to embodiments of the present disclosure.

As illustrated in FIG. 18, the present disclosure provides a control method of the electronic device 100. The control method includes the followings.

At block S02, the proximity sensor 16 is controlled to keep deactivated.

At block S03, it is determined whether the touch display screen 103 is shielded according to a signal output by the touch display screen 103.

At block S04, the touch display screen 103 is controlled to enter a black-out state and the proximity sensor 16 is activated, when the touch display screen 103 is shielded.

At block S05, a display state of the touch display screen 103 is controlled according to detection data of the proximity sensor 16.

In addition, the acts at blocks S02 to S05 of the above control method may be implemented by the processor 23. In other words, the processor 23 is configured to: control and keep the proximity sensor 16 deactivated; determine whether the touch display screen 103 is shielded according to the signal output by the touch display screen 103; control the touch display screen 103 to enter the black-out state and activate the proximity sensor 16, when the touch display screen 103 is shielded; and control the display state of the touch display screen 103 according to the detection data of the proximity sensor 16.

In the control method and the electronic device 100 according to embodiments of the present disclosure, the signal output by the touch display screen 103 of the electronic device 100 is used to control the state of the touch display screen 103 and deactivate the proximity sensor 16, preventing the infrared light emitted by the proximity sensor 16 from interfering with the touch display screen 103, and thus improving the user experience.

Figure 19:
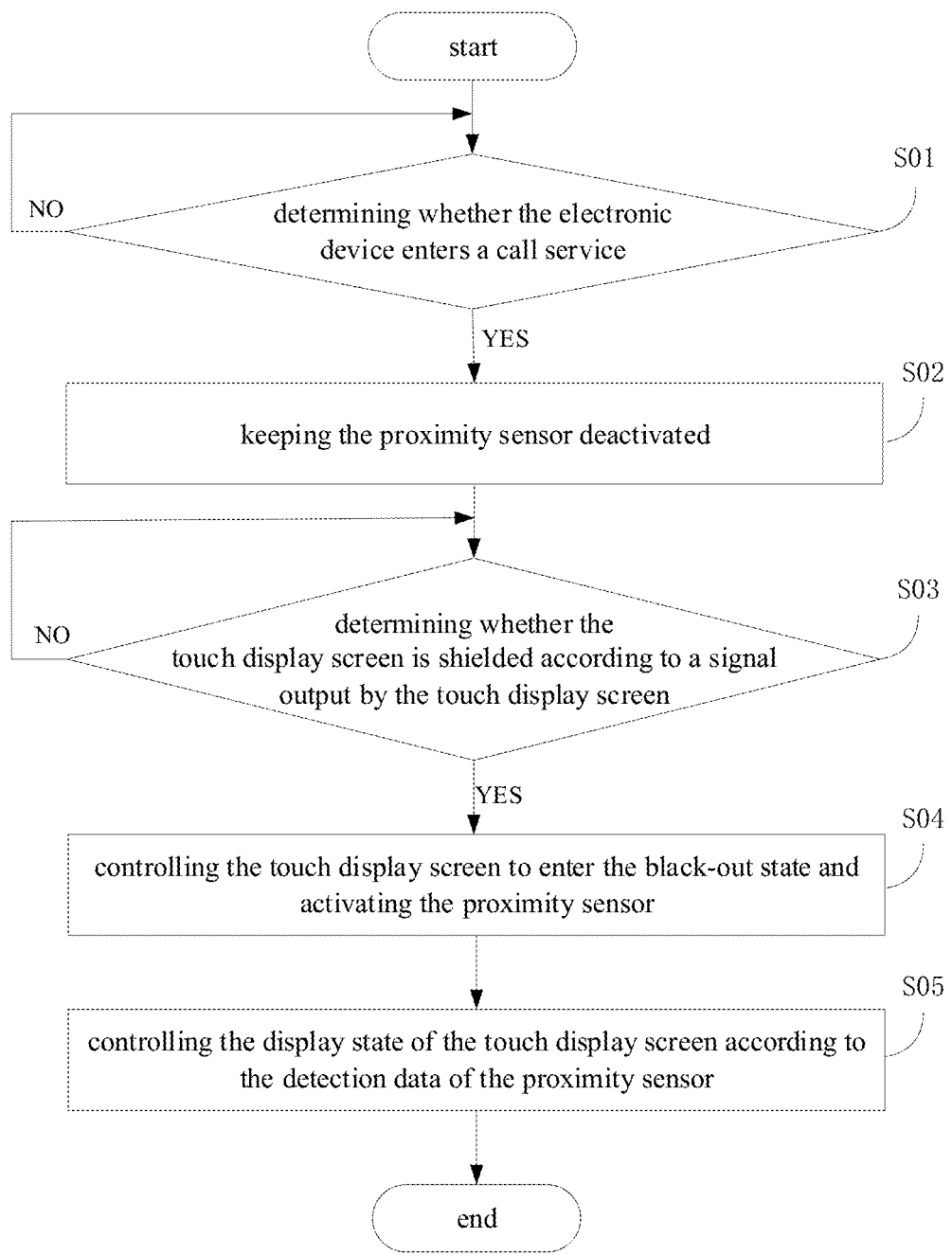
FIG. 19 is another schematic flow chart of a control method according to embodiments of the present disclosure.

As illustrated in FIG. 19, in some embodiments, before the act at block S02, the method further includes the followings.

At block S01, it is determined whether the electronic device 100 enters a call service, and if yes, the act at block S02 can be executed.

Figure 20:
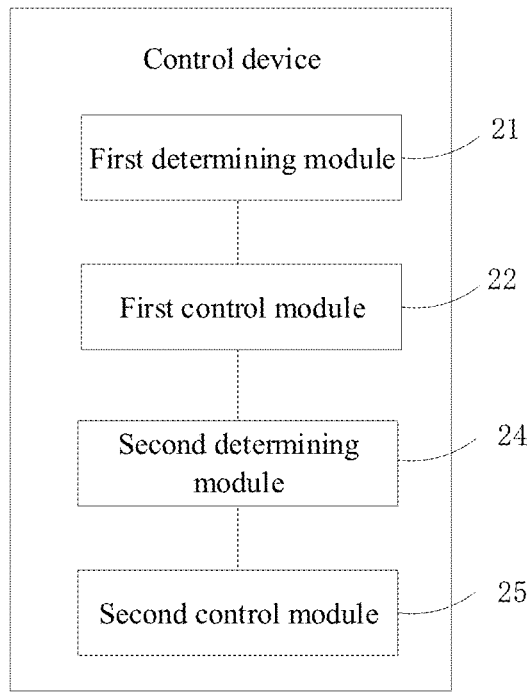
FIG. 20 is a block diagram of a control device according to embodiments of the present disclosure.

As illustrated in FIG. 20, embodiments of the present disclosure further provide a control device 2000 for the electronic device 100. The control method of the electronic device 100 according to embodiments of the present disclosure may be implemented by the control device 2000 of the electronic device 100 according to embodiments of the present disclosure.

The control device 2000 includes a first determining module 21, a first control module 22, a second determining module 24, and a second control module 25. The first determining module 21 is configured to determine whether the electronic device 100 enters a call service. The first control component 22 is configured to control the proximity sensor 16 to remain deactivated when the electronic device 100 enters the call service. The second determining module 24 is configured to determine whether the display layer 13 is close to a human head according to the signal output by the touch layer 12. The second control module 25 is configured to control the display layer 13 to enter a black-out state and to activate the proximity sensor 16 when the display layer 12 approaches the human head. The second control component 25 is further configured to control the display layer 13 to remain the black-out state or to switch to a light-up state according to the detection data of the proximity sensor 16.

In other words, the act at block S01 can be implemented by the first determining module 21, the act at block S02 can be implemented by the first control module 22, the act at block S03 can be implemented by the second determining module 24, and the acts at blocks S04 to S05 can be implemented by the second control module 25.

The touch display screen 103 may be, for example, a capacitive touch display screen 103. The touch display screen 103 can output different capacitance values according to the distance between the object and the touch display screen 103, and whether the touch display screen 103 is shielded can be determined according to the capacitance values output by the touch display screen 103 and the number of these capacitance values. For example, the touch display screen 103 outputs five capacitance values, and when the five capacitance values are substantially the same, it is determined that the touch display screen 103 is shielded.

In an example, when the electronic device 100 enters the call service, the user generally places the electronic device 100 close to the ear. During the process of placing the electronic device 100 close to the ear, since a part of the body with skins, such as face and ear, is a conductor, the touch display screen 103 can generate different signal values according to the distance between the electronic device 100 and the human head, thereby determining whether the user has completed the action of placing the electronic device 100 close to the ear and thus controlling the proximity sensor 16 to activate or not.

In addition, the user generally does not observe the screen of the electronic device 100 after placing the electronic device 100 close to the ear. In this case, the touch display screen 103 may be controlled to turn off, which does not affect the normal conversation of the user, and the proximity sensor 16 may be controlled to activate and to sense the distance between the user and the electronic device 100, such that when the processor 23 controls on and off of the touch display screen 103, the user experience is not degraded due to flicker phenomenon.

Furthermore, the proximity sensor 16 is activated only after the user places the electronic device 100 close to the ear. In other words, the proximity sensor 16 is deactivated before the user places the electronic device 100 close to the ear. Therefore, before the user places the electronic device 100 close to the ear, when the user observes the touch display screen 103, the flicker phenomenon does not occur, and the user experience will not be degraded.

In addition, in the act at block S01, the call service includes making a call, receiving a call, or connecting a call. It can be understood that when making a call, receiving a call, or connecting a call, the user generally places the electronic device 100 close to the ear, and adjusts the state of the touch display screen 103 by the proximity sensor 16 according to the distance between the electronic device 100 and the human head. In this case, the screen is turned on when the electronic device 100 is away from the human body, and turned off when the electronic device 100 is close to the human body, so that the user's mis-operation is prevented, and the power consumption of the electronic device 100 is saved. Moreover, the call service may be a process for the user to perform a voice conversation. For example, the call service is a process in which the user dials to another party and waits for the other party to answer the call, i.e., a state of making a call; or a process in which the user is talking to others through voice, i.e., a state of connecting a call; or a process in which the electronic device 100 connects into a call from the external and waits for the user to answer the call, i.e., a state of receiving a call.

At block S02, in an example, when the electronic device 100 connects into an incoming call, the touch display screen 103 is generally in a light-up state. For example, the touch display screen 103 displays the caller's name, telephone number, and the like when the electronic device 100 receives a call. In this case, the proximity sensor 16 remains deactivated, and the proximity sensor 16 can be prevented from emitting infrared light, and thus the user cannot observe the flicker phenomenon due to the infrared light when viewing the touch display screen 103.

At block S03, the touch display screen 103 being shielded may refer to that the touch display screen 103 is completely shielded, or may refer to that the touch screen display 103 is partially shielded. For example, the touch display screen 103 is shielded when it is in contact with or near the human head.

At block S04, after the touch display screen 103 enters the black-out state, the infrared light emitted by the proximity sensor 16 does not affect the touch display screen 103. Even if the infrared light emitted by the proximity sensor 16 causes the flicker phenomenon on the touch display screen 103, the flicker phenomenon will not be observed, since the user is answering the call.

At block S05, the black-out state of the touch display screen 103 includes the display area 1311 being blacked out fully; or a part of the display area 1311 displaying predetermined content while a remaining of the display area 1311 being blacked out. When the display area 1311 is fully in the black-out state, the display area 1311 appears black.

A part of the display area 1311 displaying the predetermined content while the remaining of the display area 1311 being blacked out refers to that only the part of the display area 1311 is lighted up to display the predetermined content, and the remaining of the display area 1311 is blacked out. For example, when only a part of the display area 1311 is lighted up to display the predetermined content, the touch display screen 103 is in an AOD (Always on Display) mode. The predetermined content may be, for example, time. In other words, the display area 1311 can display time information regardless of whether the touch display screen 103 enters the black-out state or the light-up state. Certainly, the predetermined content may also be the date, the strength of the signal of the electronic device 100, and the like. Preferably, the part of the display area 1311 for displaying predetermined content and the proximity sensor 16 are staggered in the thickness direction of the touch display screen 103.

The light-up state of the touch display screen 103 refers to that the whole of the display area 1311 of the display layer 13 is lighted up to enable the display area 1311 to display content. In this case, the user can touch the touch display screen to perform respective operations.

Figure 21:
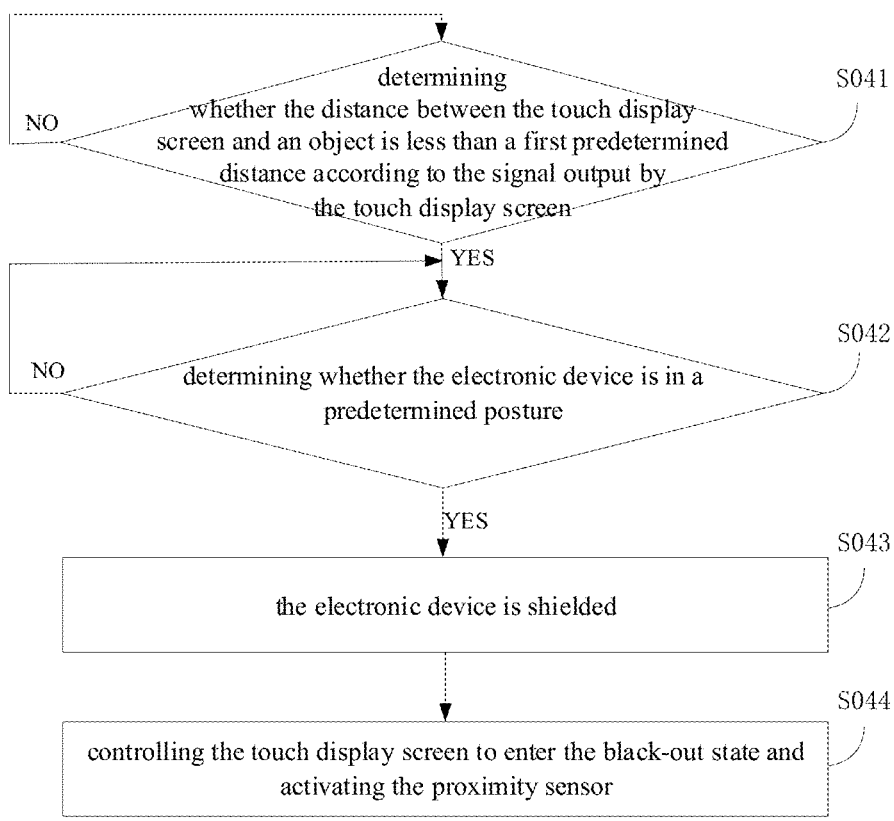
FIG. 21 is another schematic flow chart of a control method according to embodiments of the present disclosure.

As illustrated in FIG. 21, in some embodiments, the act at block S04 includes the followings.

At block S041, it is determined whether the distance between the touch display screen 103 and the object is less than a first predetermined distance according to the signal output by the touch display screen 103.

At block S042, the posture of the electronic device 100 is detected and it is determined whether the electronic device 100 is in a predetermined posture.

At block S043, it is determined that the electronic device 100 is shielded when the distance between the touch display screen 103 and the object is less than the first predetermined distance and the electronic device 100 is in the predetermined posture.

At block S044, the display layer 13 is controlled to enter the black-out state and the proximity sensor 16 is activated.

In some embodiments, the above acts at blocks S041 to S044 can be implemented by the processor 23.

Figure 22:
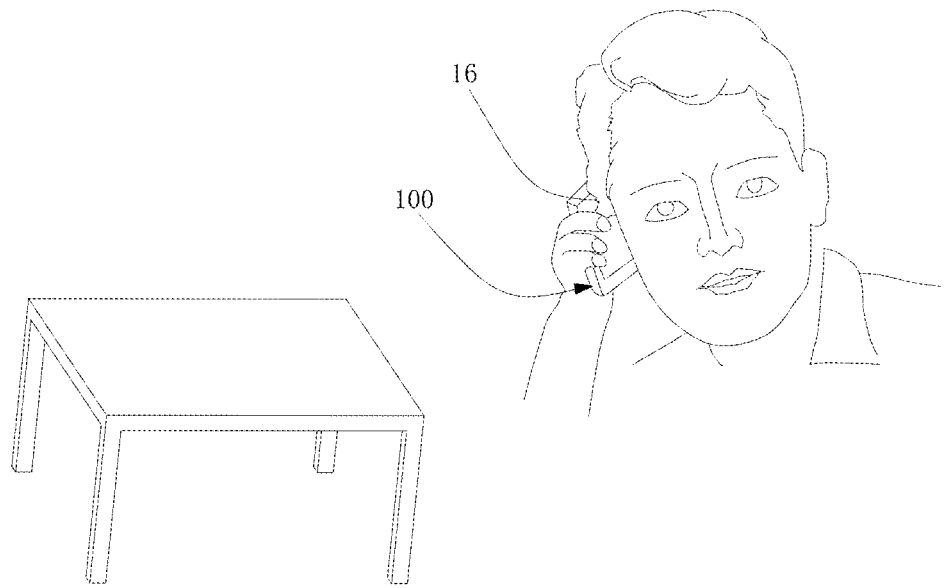
FIG. 22 is a schematic diagram illustrating a usage scenario of an electronic device according to embodiments of the present disclosure.

As such, this makes the process of controlling the proximity sensor 16 to activate and controlling the display layer 13 to turn off more accurately. As illustrated in FIG. 22, it can be understood that in some scenarios, even if the electronic device 100 enters the call service, it is not sufficient to determine that the user has completed the action of placing the electronic device 100 close to the ear according to the signal output by the touch display screen 103. For example, after the electronic device 100 enters the call service, the user's finger touches the touch display screen 103, in which process, the electronic device 100 is not placed close to the user's ear, but the touch display screen 103 also outputs a different signal.

Then, by determining the posture of the electronic device 100, it is further determined whether the electronic device 100 is placed close to the ear of the user. In detail, the posture of the electronic device 100 can be determined using a sensor such as a gyroscope or a gravity sensor. In addition, the electronic device 100 can be placed in many postures, for example, in a laid-down posture, in an inverted posture, or in a vertical posture. Since the user usually has a hand-raising action to place the electronic device 100 at the user's ear in the vertical posture when proceeding a conversation, the predetermined posture can be set as the vertical posture in which the electronic device 100 is placed after the user performs the hand-raising action. It can be understood that the process of the user raising the hand can be detected by the gyroscope, the gravity sensor, and the like of the electronic device 100.

At block S041, as described above, the distance between the touch display screen 103 and the object can be determined according to the capacitance values output by the touch display screen 103 and the number of these capacitance values.

At block S042, the posture of the electronic device 100 can be detected by a sensor such as a gyroscope of the electronic device 100.

It is to be noted that, in the example of the present disclosure, the act at block S042 is performed after the act at block S041. However, in other embodiments, the act at block S042 may be performed before the act at block S041, or may be performed simultaneously with the act at block S041.

In some embodiments, the act at block S03 includes determining whether the display layer 13 is shielded according to a signal output by the top area of the touch display screen 103.

In some embodiments, the processor 23 is configured to determine whether the display layer 13 is shielded according to a signal output by the top area of the touch display screen 103.

Since the receiver of the electronic device 100 is generally disposed at the top of the electronic device 100, in an example, when the user answers the call, the top of the electronic device 100 is closer to the vicinity of the ear. Therefore, the accuracy of determining whether the electronic device 100 is close to the head can be improved by determining whether the touch display screen 103 is shielded according to the signal output by the top area of the touch display screen 103.

Figure 23:
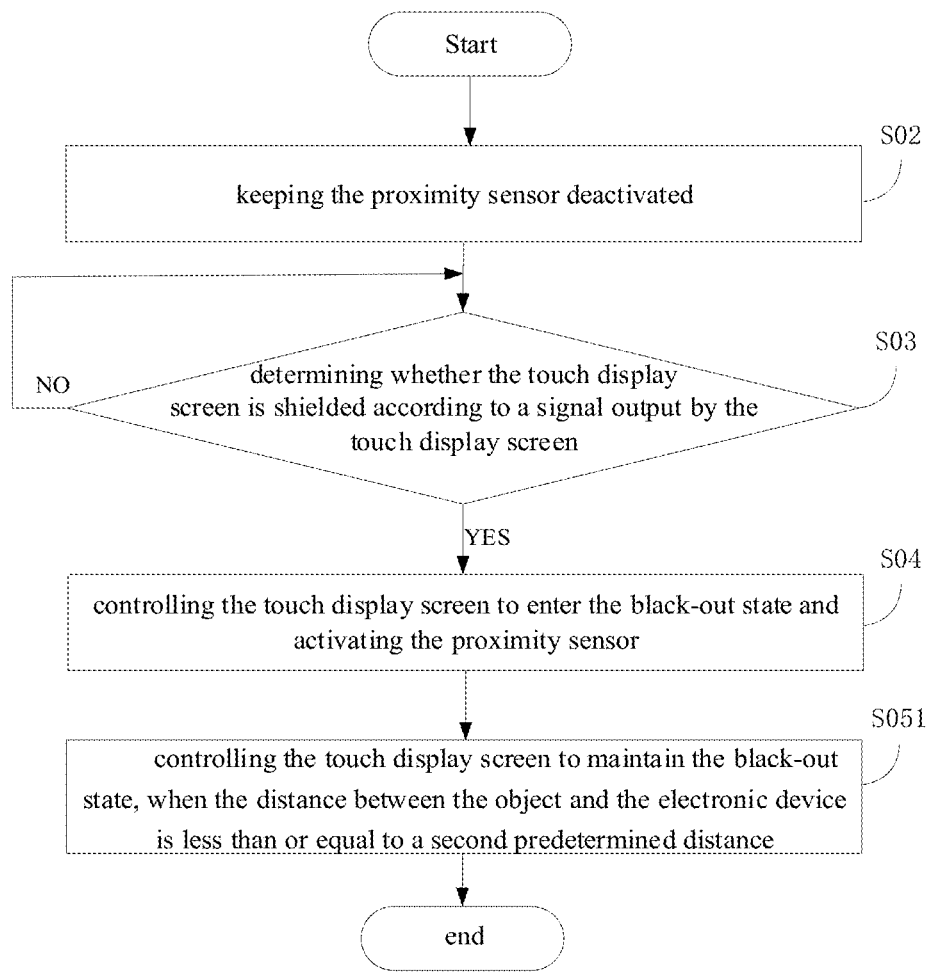
FIGS. 23-25 are schematic flow charts of a control method according to embodiments of the present disclosure.

As illustrated in FIG. 23, in some embodiments, the act at block S05 includes the followings.

At block S051, when the distance between the object and the electronic device 100 is less than or equal to a second predetermined distance, the display layer 13 is controlled to maintain the black-out state.

In some embodiments, the processor 23 is configured to control the display layer 13 to maintain the black-out state when the distance between the human head and the electronic device 100 is less than or equal to the second predetermined distance.

In this way, the power consumption of the electronic device 100 can be saved.

Figure 24:
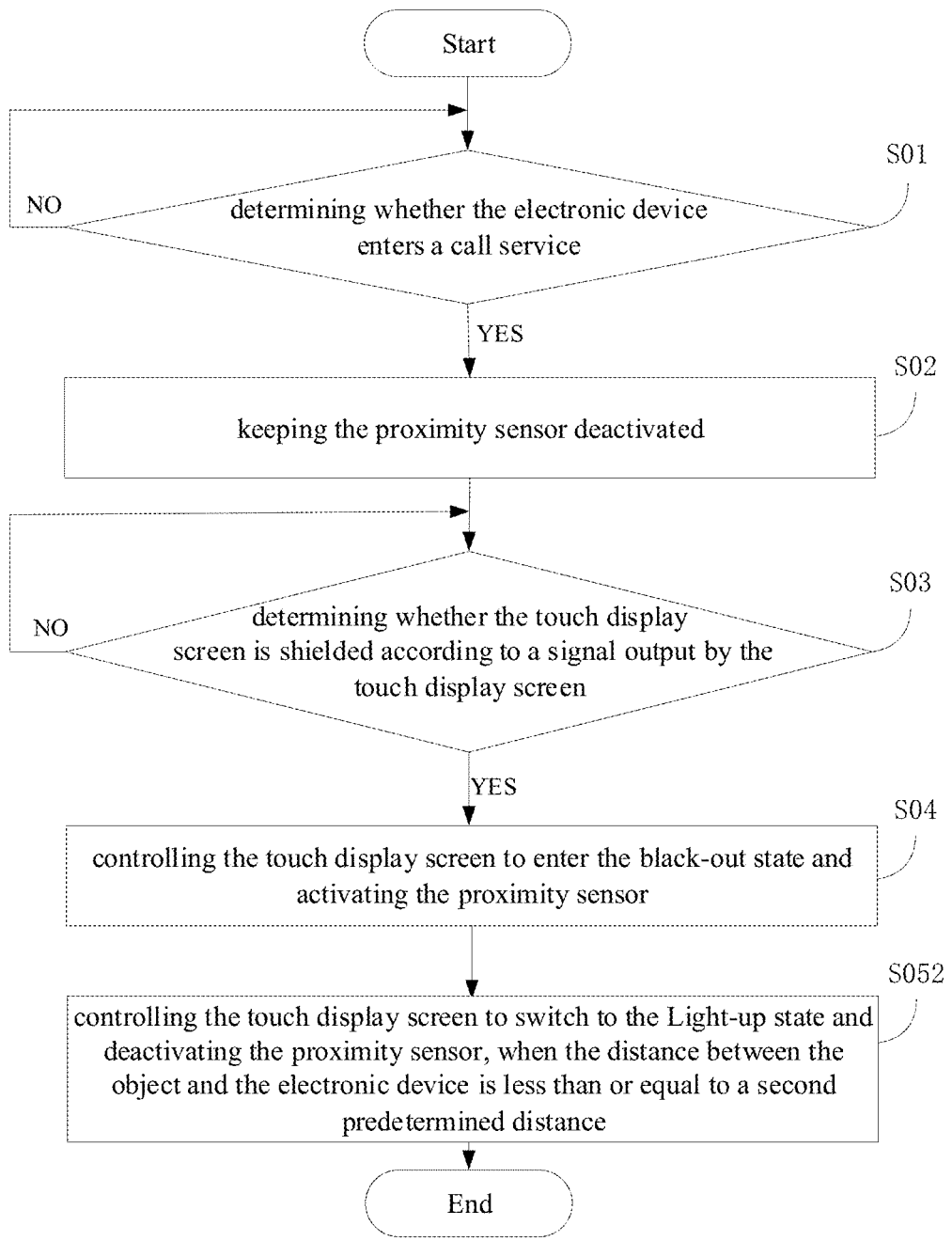

As illustrated in FIG. 24, in some embodiments, after the act at block S05, the method further includes the followings.

At block S052, when the distance between the object and the electronic device 100 is greater than the second predetermined distance, the touch display screen 103 is controlled to switch to the light-up state and the proximity sensor 16 is deactivated. Thus, it is possible to prevent the infrared light emitted by the proximity sensor 16 from causing the flicker phenomenon on the display layer 13.

Figure 25:
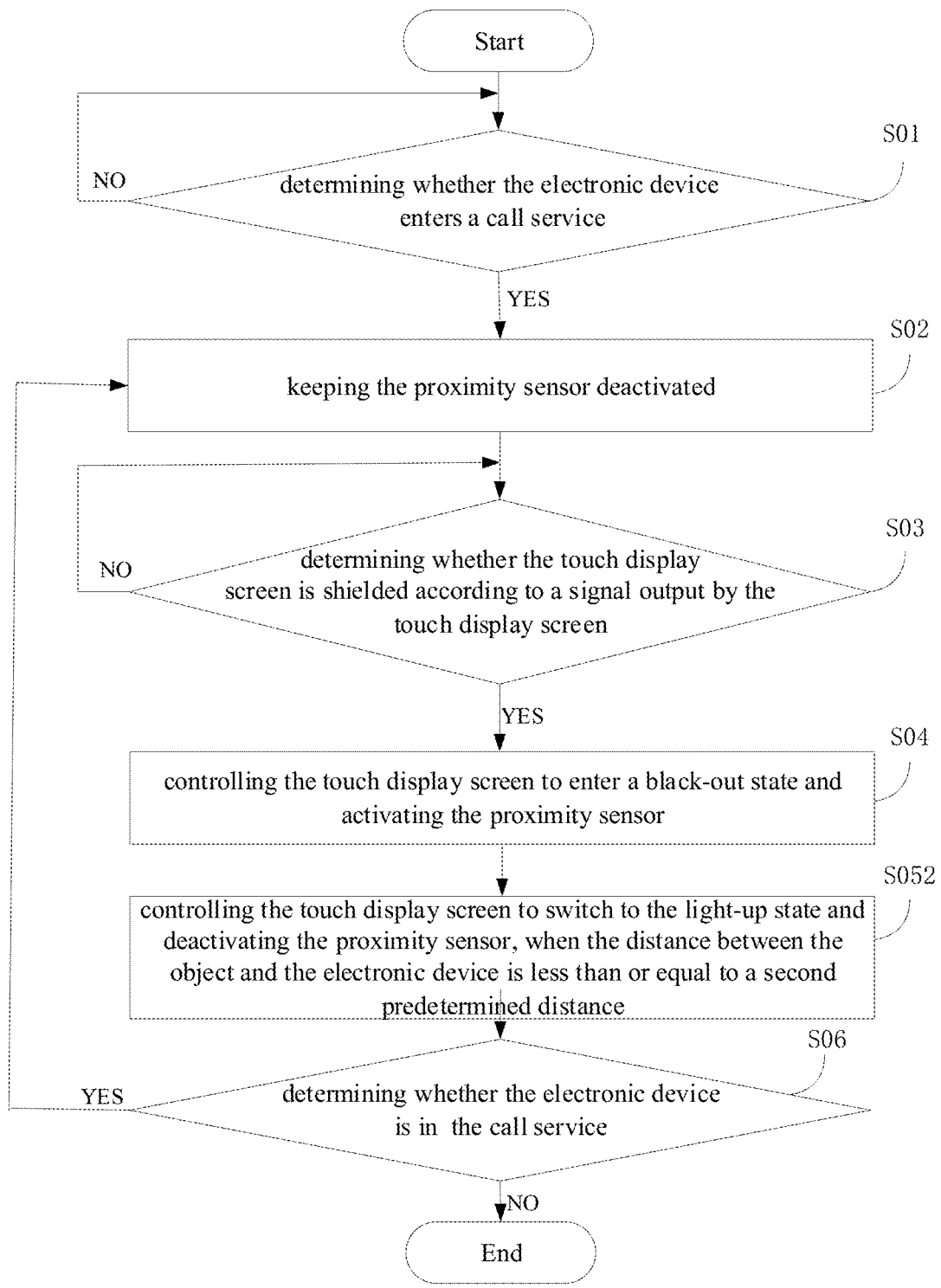
Figure 26:
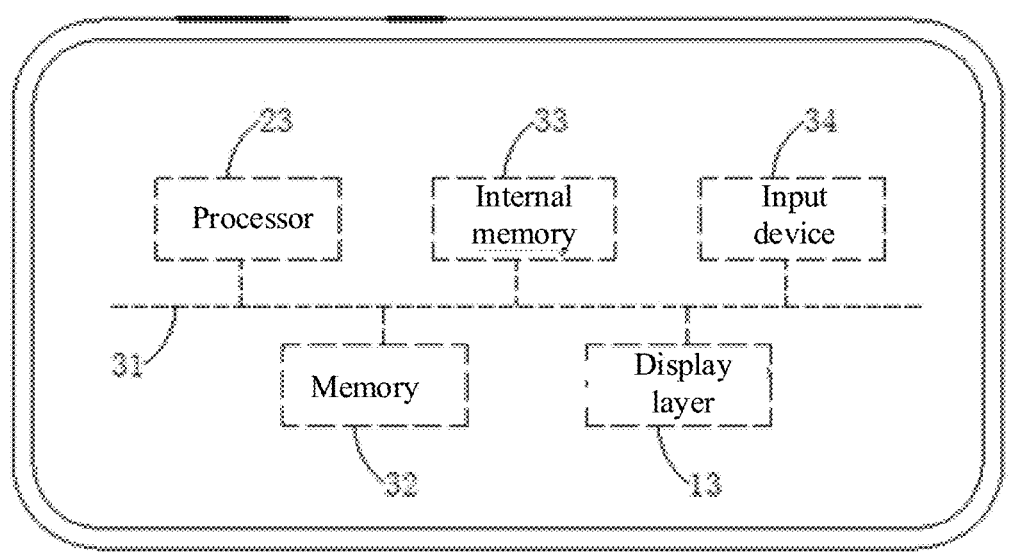
FIG. 26 is a schematic diagram of a computer device according to embodiments of the present disclosure.

As illustrated in FIG. 25, in some embodiments, the control method further includes the followings after the act at block S052.

At block S06, it is determined whether the electronic device 100 in a call service, and if yes, the act at block S02 can be executed.

In some embodiments, the processor 23 is configured to determine whether the electronic device 100 is in a call service and keep the proximity sensor 16 deactivated when the electronic device 100 is in the call service.

In this way, the user is not disturbed by the flicker phenomenon when the electronic device 100 is taken away from the ear during the call, thereby improving the user experience. It can be understood that during the call, the user may temporarily take the electronic device 100 away from the ear and operate the electronic device 100 via the touch display screen 103. In this case, if the proximity sensor 16 maintains activated, the flicker phenomenon caused by the infrared light emitted by the proximity sensor 16 interfering with the touch display screen 103 may degrade the user experience. Therefore, when the distance between the object and the electronic device 100 is greater than the second predetermined distance, the touch display screen 103 is controlled to switch to the light-up state, so that the user can operate the electronic device 100 via the touch display screen 103.

Then, when the electronic device 100 is not in the call service, it can be inferred that the call has ended, and therefore, the control method directly ends. When the electronic device 100 is still in the call service, it can be inferred that the user temporarily takes the electronic device 100 away from the ear to operate the electronic device 100 via the touch display screen 103. Therefore, the proximity sensor 16 is controlled to deactivate to avoid the flicker phenomenon caused by the infrared light emitted by the proximity sensor 16 interfering with the touch display screen 103.

Since the user takes the electronic device 100 back to the ear and continues the call after temporarily taking the electronic device 100 away from the ear, the act at block S02 can be executed to control the proximity sensor 16 to activate and control the touch display screen 103 to enter the black-out state, when the user takes the electronic device 100 back to the ear.

The present disclosure further provides an electronic device 100. The electronic device 100 includes a touch display screen 103 and a proximity sensor 16, the proximity sensor 16 is disposed under the touch display screen 103, and the touch display screen 103 is configured to detect the distance between the object and the electronic device 100 when the touch display screen 103 is turned on, to output a signal that controls the display state of the touch display screen 103. The proximity sensor 16 is deactivated when the touch display screen 103 is turned on, and the proximity sensor 16 is activated when the touch display screen 103 is turned off.

In some embodiments, the display state of the touch display screen 103 includes a light-up state and a black-out state. The proximity sensor 16 is activated when the touch display screen 103 is in the black-out state, and the proximity sensor maintains deactivated before the touch display screen 103 enters the black-out state.

It should be noted that the touch display screen 103 being turned on refers to that the touch display screen 103 is lighted up, and the touch display screen 103 being turned off refers to that (all or a part of) the touch display screen 103 is blacked out, or appears black, and the touch display screen 103 is not powered off. In addition, the touch display screen 103 being turned on refers to that the touch display screen 103 is in the light-up state, and the touch display screen 103 being turned off refers to that the touch display screen 103 is in the black-out state.

There are two types of capacitive sensors, i.e., mutual-capacitance sensors and self-capacitance sensors, disposed on a touch screen that support floating touch. The self-capacitance sensor can generate a signal that is stronger than a signal generated by the mutual capacitance, and can detect a farther finger sensing and detection range of up to 20 mm. The electric field of the mutual-capacitance sensor is so small that the signal strength is very low and it is impossible to sense those very weak signals. Therefore, when the user's finger hovers over the screen, the mutual-capacitance sensor cannot sense the signal. The self-capacitance sensor is larger than the mutual capacitance sensor. A large sensor creates powerful signals that allow the device to detect a finger up to 20 mm above the screen. The floating touch is achieved by running both the self-capacitance sensor and the mutual-capacitance sensor on the touch screen. The mutual-capacitance sensor is configured to complete normal touch sensing, including multi-touch. The self-capacitance sensor is configured to detect the finger hovering above the screen. Since the floating touch technology relies on the self-capacitance sensor, it is impossible to implement floating multi-touch. In other words, when the floating operation is performed, the screen does not support multi-touch, and the screen can only achieve multi-touch in the case of contacting and touching.

Embodiments of the present disclosure further provide a computer readable storage medium. The non-volatile computer readable storage medium includes computer executable instructions that, when executed by one or more processors 23, cause the processor 23 to perform the control method of any of the above embodiments.

As illustrated in FIG. 25, embodiments of the present disclosure further provide a computer device 300. The computer device includes a memory 32 and the processor 23. The computer readable instructions are stored in the memory 32. When the instructions are executed by the processor 23, the processor 23 executes the control method of any of the above embodiments.

FIG. 25 is a schematic diagram illustrating internal components of the computer device 300 in an embodiment. The computer device 300 includes the processor 23 and the memory 32 (e.g., a non-volatile storage medium), an internal memory 33, a display layer 13, and an input device 34 that are coupled by a system bus 31. The memory 32 of the computer device 300 stores an operating system and computer readable instructions. The computer readable instructions are executable by the processor 23 to implement the control method of any of the above embodiments.

The processor 23 may be configured to provide computing and control capabilities to support operation of the entire computer device 300. The internal memory 33 of the computer device 300 provides an environment for the computer readable instructions in the memory 32 to operate. The display layer 13 of the computer device 300 may be an OLED display layer or a Micro LED display layer or the like. The input device 34 may be the touch display screen 103 disposed on the display layer 13, or may be a button, a trackball or the touchpad provided on the outer casing of the computer device 300, even an external keyboard, a touchpad or a mouse. The computer device 300 can be a cell phone, a tablet, a laptop, a personal digital assistant, or a wearable device (e.g., a smart bracelet, a smart watch, a smart headset, smart glasses), and the like. Those skilled in the art can understand that the structure illustrated in the drawing is only a schematic diagram of a part of the structure related to the solution of the present disclosure, and does not constitute a limitation of the computer device 300 to which the solution of the present disclosure is applied. In detail, the computer device 300 may include more or fewer components than those illustrated in the drawings, or may be combined with some components, or have a different arrangement for components.

Those skilled in the art may understand that all or parts of the acts in the above exemplifying method of the present disclosure may be achieved by commanding the related hardware with computer programs. The computer programs may be stored in a non-volatile computer readable storage medium, and the computer programs may include the flow of each solution described above in the method embodiments of the present disclosure when running. The storage medium may be a magnetic disk, an optical disk, a read-only memory (ROM), or the like.

The above embodiments illustrate merely some implementations of the present disclosure, which are described in details but are not construed to limit the scope of the present disclosure. It should be noted that, for those skilled in the art, without departing from the principle of the present disclosure, various changes and improvements may be made, which are covered by the protection scope of the present disclosure. Therefore, the protection scope of the present disclosure follows the appended claims.

What is claimed is:

1. A control method of an electronic device, wherein the electronic device comprises a touch display screen and a proximity sensor, the touch display screen comprises a display area, the proximity sensor is disposed under the display area of the touch display screen, and the control method comprises:
   keeping the proximity sensor deactivated when the touch display screen is not shielded according to a first signal value output by the touch display screen;
   determining whether the touch display screen is shielded according to a second signal value output by the touch display screen;
   controlling the touch display screen to enter a black-out state and controlling the proximity sensor to be activated from a deactivated state when the touch display screen is shielded; and
   controlling a display state of the touch display screen according to detection data of the proximity sensor.

2. The control method according to claim 1, wherein controlling the touch display screen to enter the black-out state and activating the proximity sensor when the touch display screen is shielded, comprises:
   determining whether a distance between the touch display screen and an object is less than a first predetermined distance according to the second signal value output by the touch display screen;
   detecting a posture of the electronic device and determining whether the electronic device is in a predetermined posture;
   determining that the electronic device is shielded, when the distance between the touch display screen and the object is less than the first predetermined distance and the electronic device is in the predetermined posture; and
   controlling the touch display screen to enter the black-out state and activating the proximity sensor.

3. The control method according to claim 1, wherein determining whether the touch display screen is shielded according to the second signal value output by the touch display screen, comprises:
   determining whether the touch display screen is shielded according to a signal value output by a top area of the touch display screen.

4. The control method according to claim 1, wherein controlling the display state of the touch display screen according to the detection data of the proximity sensor, comprises:
   controlling the touch display screen to maintain the black-out state, when a distance between an object and the electronic device is less than or equal to a second predetermined distance.

5. The control method according to claim 1, wherein controlling the display state of the touch display screen according to the detection data of the proximity sensor, comprises:
   controlling the touch display screen to switch to a light-up state and deactivating the proximity sensor, when a distance between an object and the electronic device is greater than a second predetermined distance.

6. The control method according to claim 5, wherein after controlling the touch display screen to switch to the light-up state and deactivating the proximity sensor, the control method further comprises:
   determining whether the electronic device is in a call service; and
   keeping the proximity sensor deactivated, when the electronic device is in the call service.

7. The control method according to claim 1, wherein the black-out state of the touch display screen comprises:
   the entire display area being blacked out; or
   a part of the display area displaying predetermined content while a remaining of the display area being blacked out.

8. The control method according to claim 1, wherein before keeping the proximity sensor deactivated, the control method further comprises:
   determining whether the electronic device enters a call service; and
   keeping the proximity sensor deactivated when the electronic device enters the call service.

9. The control method according to claim 1, wherein the detection data of the proximity sensor corresponds to determining a location of an object spaced apart from the touch display screen.

10. An electronic device, comprising a touch display screen, a proximity sensor, and a processor, wherein the touch display screen comprises a display area, the proximity sensor is disposed under the display area of the touch display screen, and the processor is configured to:
    keep the proximity sensor deactivated when the touch display screen is not shielded according to a first signal value output by the touch display screen;
    determine whether the touch display screen is shielded according to the second signal value output by the touch display screen;
    control the touch display screen to enter a black-out state and control the proximity sensor to be activated from a deactivated state, when the touch display screen is substantially shielded; and
    control a display state of the touch display screen according to detection data of the proximity sensor.

11. The electronic device according to claim 10, wherein the processor is configured to:
    determine whether a distance between the touch display screen and an object is less than a first predetermined distance according to the second signal value output by the touch display screen;
    detect a posture of the electronic device and determine whether the electronic device is in a predetermined posture;
    determine that the electronic device is shielded, when the distance between the touch display screen and the object is less than the first predetermined distance and the electronic device is in the predetermined posture; and
    control the touch display screen to enter the black-out state and activate the proximity sensor.

12. The electronic device according to claim 10, wherein the processor is configured to determine whether the touch display screen is shielded according to a signal value output by a top area of the touch display screen.

13. The electronic device according to claim 10, wherein the processor is configured to control the touch display screen to maintain the black-out state when a distance between an object and the electronic device is less than or equal to a second predetermined distance.

14. The electronic device according to claim 10, wherein the processor is configured to control the touch display screen to switch to a light-up state and deactivate the proximity sensor, when a distance between an object and the electronic device is greater than a second predetermined distance.

15. The electronic device according to claim 14, wherein the processor is further configured to determine whether the electronic device is in a call service after controlling the touch display screen to switch to the light-up state and deactivating the proximity sensor, and keep the proximity sensor deactivated if the electronic device is in the call service.

16. The electronic device according to claim 10, wherein the processor is further configured to determine whether the electronic device enters a call service before keeping the proximity sensor deactivated, and keep the proximity sensor deactivated if the electronic device enters the call service.

17. The electronic device according to claim 10, wherein the display layer comprises an upper surface and a lower surface opposite to the upper surface, the electronic device further comprises a first coating layer coated on the lower surface and covering the proximity sensor, the first coating layer is configured to transmit infrared light and block visible light, the proximity sensor is configured to transmit and/or receive infrared light through the first coating layer and the touch display screen.

18. The electronic device according to claim 11, wherein the electronic device further comprises a housing, a receiving case, a light guide and a light sensor, the receiving case is slidably coupled to the housing and capable of extending out of or retracting into the housing, the receiving case is provided with a light incident hole, the light guide is received in the receiving case and partially extends into the light incident hole, the light guide has a light incident surface and a light emitting surface opposed to the light incident surface, the light incident surface faces an outside of the receiving case, and the light emitting surface faces an interior of the receiving case, the light sensor is received in the receiving case and directly faces the light emitting surface, the touch display screen is disposed on the housing.

19. The electronic device according to claim 18, wherein the receiving case has an inner side surface, the inner side surface defines a positioning groove, the positioning groove communicates with the light incident hole, the light guide comprises a light incident portion and a light emitting portion, the light incident surface is an end surface of the light incident portion away from the light emitting portion, the light emitting surface is an end surface of the light emitting portion away from the light incident portion, the light incident portion passes through the light incident hole, and the light emitting portion is partially or completely inserted in the positioning groove.

* * * * *